(12) United States Patent
Bennett

(10) Patent No.: US 6,466,998 B1
(45) Date of Patent: Oct. 15, 2002

(54) INTERRUPT ROUTING MECHANISM FOR ROUTING INTERRUPTS FROM PERIPHERAL BUS TO INTERRUPT CONTROLLER

(75) Inventor: Joseph A. Bennett, Roseville, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/382,668

(22) Filed: Aug. 25, 1999

(51) Int. Cl.[7] .............................................. G06F 5/00
(52) U.S. Cl. ........................ 710/48; 710/47; 710/262; 710/266; 712/224; 713/1
(58) Field of Search ................ 710/7, 10, 48, 710/49, 50, 243, 260, 261–266, 47; 713/1, 2, 100; 709/220; 712/224, 233

(56) References Cited

U.S. PATENT DOCUMENTS

| | | | | |
|---|---|---|---|---|
| 5,535,420 A | * | 7/1996 | Kardach et al. | 710/48 |
| 5,737,615 A | * | 4/1998 | Tetrick | 713/324 |
| 5,815,706 A | * | 9/1998 | Stewart et al. | 713/2 |
| 5,961,641 A | * | 10/1999 | Hasegawa et al. | 713/1 |
| 5,974,565 A | * | 10/1999 | Okuhara et al. | 714/11 |
| 6,006,301 A | * | 12/1999 | Tetrick | 710/128 |
| 6,247,091 B1 | * | 6/2001 | Lovett | 710/260 |
| 6,253,304 B1 | * | 6/2001 | Hewitt et al. | 712/6 |

OTHER PUBLICATIONS

U.S. patent application Ser. No. 09/192,442, Haren et al., filed Feb. 2001.*

* cited by examiner

Primary Examiner—Jeffrey Gaffin
Assistant Examiner—Rijue Mai
(74) Attorney, Agent, or Firm—Antonelli, Terry, Stout & Kraus, LLP (57) ABSTRACT

An interrupt routing mechanism implemented in a host chipset to eliminate the need for the general purpose I/O pins, special software and external logic devices to steer particular interrupts from a non-legacy Peripheral Component Interconnect (PCI) bus to an external interrupt controller. Such an interrupt routing mechanism may be implemented by a series of logic gates such as OR gates and AND gates for combining all interrupts from a non-legacy PCI bus to produce an output boot interrupt to an external interrupt controller, and alternatively, implemented by a series of AND gates for combining all interrupts from a non-legacy PCI bus and a switch for forwarding an output boot interrupt to an external interrupt controller in accordance with a disable bit used for the steering function.

26 Claims, 4 Drawing Sheets

INTERRUPT ROUTING MECHANISM FOR ROUTING INTERRUPTS FROM PERIPHERAL BUS TO INTERRUPT CONTROLLER

TECHNICAL FIELD

The present invention relates to an interrupt controller, and more particularly, relates to an interrupt routing mechanism for routing interrupts from a peripheral bus to an interrupt controller for booting an operating system (OS).

BACKGROUND

Computer systems are designed to support one or more input/output (I/O) devices, including, for example, keyboards, input mouses, disk controllers, serial and parallel ports to printers, scanners, and display devices. These P,O devices require intermittent servicing by a host processor in order to ensure proper operation. Services may include data transmission, data capture and/or any other data manipulative operations essential to the functionality of the I/O devices. Each I/O device may have a different servicing schedule that is defined by the type of I/O device and its current condition. The host processor is required to service these I/O devices in accordance with their individual needs while running one or more background programs. Two methods of advising the host processor of a service need from an I/O device have been used: polled device and device interrupt method. In the former method, each I/O device is periodically checked to see if a flag has been set indicating a service request, while, in the latter method, the device service request is routed to an interrupt controller that can interrupt the host processor, forcing a branch of its current program to a special interrupt service routine. The interrupt method provides much improved processing efficiency in comparison with polling since interrupt routines are executed only when required.

A well known example of an interrupt controller is the 8259 Programmable Interrupt Controller (PIC) manufactured by Intel Corporation. Each 8259 PIC may include up to eight interrupt request lines (IR0–IR7) to service interrupt request inputs from various I/O devices and an interrupt (INTR) output line to the host processor. Multiple 8259 PIC configurations may be available to provide an expanded number of usable I/O interrupt request lines. Generally, one or more of the 8259 PIC's interrupt request inputs may be asserted at any given time. The 8259 PIC uses a priority scheme to determine which of the pending interrupt requests is the most important, and then passes that interrupt request along to the host processor by asserting the processor interrupt request via the INTR output line. However, the 8259 PIC was designed for single processor implementations and has no mechanism to direct interrupt requests to different processors in multi-processor systems such as servers and/or workstations.

A more advanced interrupt controller is known, for example, as the 82489DX Advanced Programmable Interrupt Controller (APIC) also manufactured by Intel Corporation. The APIC system supports 8259 compatible operations, but provides a more flexible and easy to implement solution for handling interrupt requests from I/O devices in a multi-processor system when compared to the 8259 mechanism. Such an APIC system typically includes an I/O APIC module which receives interrupt requests from I/O devices and routes those interrupt requests to local APIC modules embedded in different processors of a multi-processor system over a dedicated APIC bus, as described in detail in a publication entitled "82489DX *Advanced Programmable Interrupt Controller*" published by Intel Corporation. The APIC interrupt architecture is well described in the "*MultiProcessor Specification* (MPS)" Version 1.1., September 1994, Order Number 242016-003 from Intel Corporation.

Since the APIC system is a relatively new system component, only most recent operating systems (OS) such as Microsoft Windows NT and Windows 2000 Operating Systems may handle necessary levels of interrupts for processors using APIC systems. Many popular operating systems such as Microsoft Windows 95/98, Sun Solaris and Netware Novell may not support APIC systems. Therefore, 8259 PIC may be incorporated into a system board along with the APIC system to ensure proper operation of an operating system (OS) regardless whether such an operating system (OS) may or may not support an APIC system. However, external logic devices are required to route particular interrupts from a non-legacy peripheral bus to the 8259 PIC. General purpose I/O pins are then needed to enable/disable this functionality once an operating system (OS) which understands the APIC system is loaded. In addition, special software must also be written to operate those general purpose I/O pins to steer those particular interrupts to the 8259 PIC. Accordingly, there is a need for an efficient means for routing interrupts from a peripheral bus such as a non-legacy PCI bus to an interrupt controller such as Intel 8259 PIC for booting an operating system (OS).

SUMMARY

Accordingly, various embodiments of the present invention are directed to an interrupt routing mechanism of a host chipset for routing interrupts from a peripheral bus to an interrupt controller external to the host chipset. Such an interrupt routing mechanism comprises input terminals coupled to interrupt request lines of input/output (I/O) devices from the peripheral bus, to receive incoming interrupts from the peripheral bus; and logic circuitry operated to logically combine the interrupts and to pass an output boot interrupt to the interrupt controller, when an operating system does not support an advanced peripheral interrupt controller integrated in the host chipset.

BRIEF DESCRIPTION OF THE DRAWINGS

A more complete appreciation of exemplary embodiments of the present invention, and many of the attendant advantages of the present invention, will become readily apparent as the same becomes better understood by reference to the following detailed description when considered in conjunction with the accompanying drawings in which like reference symbols indicate the same or similar components, wherein.

DETAILED DESCRIPTION

The present invention is applicable for use with all types of interrupts, interrupt controllers and chipsets, including chipsets with PCI 64-bit hubs (P)64H) and P64H follow-on products, and new chipsets having advanced interrupt controllers incorporated therein and new computer platforms which may become available as computer technology develops in the future. However, for the sake of simplicity, discussions will concentrate mainly on exemplary use of an APIC system such as an Intel 82489DX APIC and an example interrupt controller such as an Intel 8259 PIC, although the scope of the present invention is not limited thereto.

Figure 1:
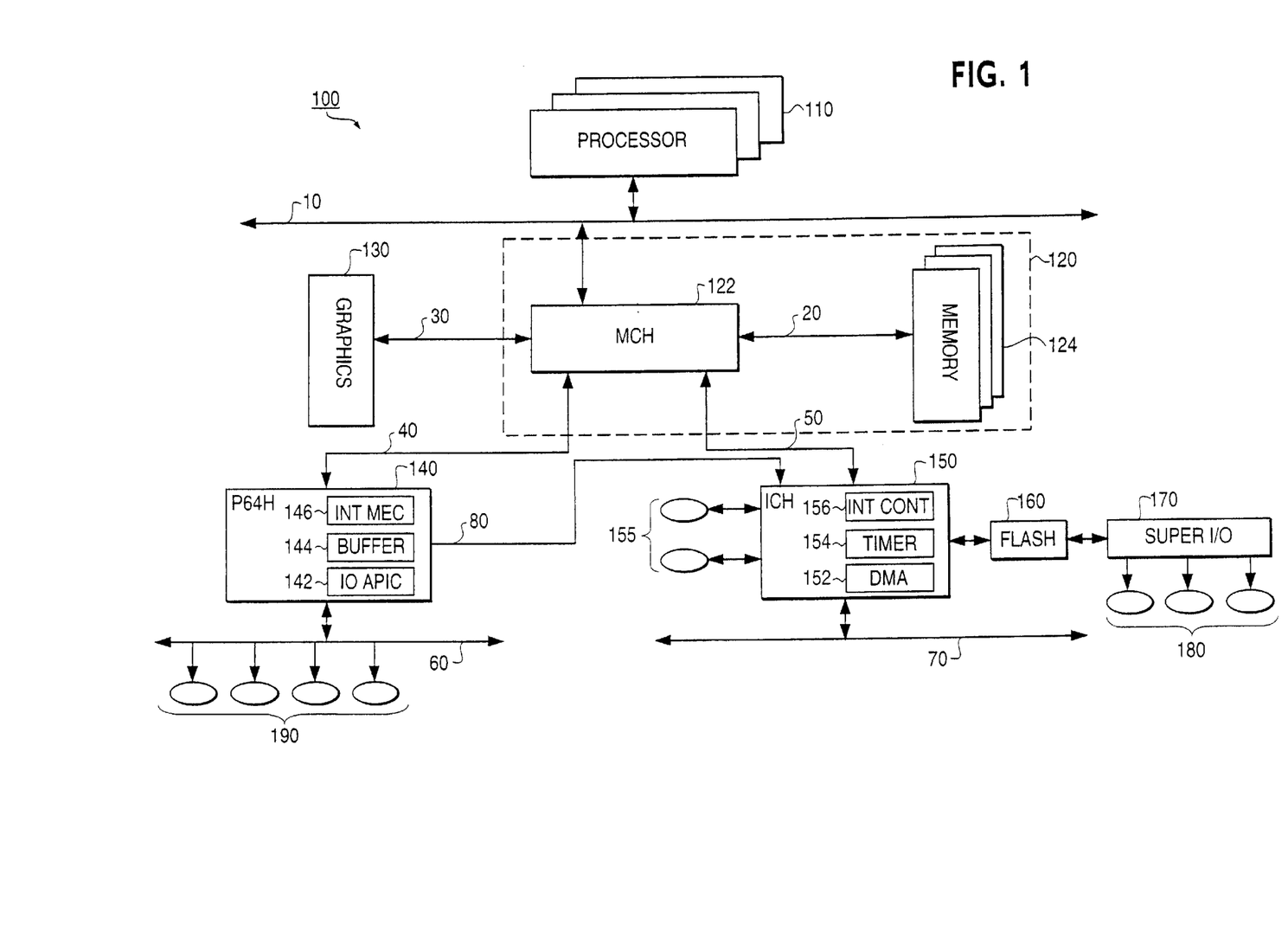
FIG. 1 illustrates an example computer system platform having an APIC system and an example interrupt controller incorporated therein according to the principles of the present invention.

Attention now is directed to the drawings and particularly to FIG. 1, an example computer system platform having an APIC system such as Intel 82489DX APIC and an example interrupt controller such as Intel 8259 PIC incorporated to handle different levels of interrupts while ensuring proper operation of currently available operating systems (OS) according to the principles of the present invention is illustrated. As shown in FIG. 1, the computer system 100 may comprise a processor subsystem 110, a memory subsystem 120, connected to the processor subsystem 110 by a front side bus 10, graphics 130 connected to the memory subsystem 120 by a AGP or graphics bus 30, one or more host chipsets (e.g., expansion bridges) 140–150 connected to the memory subsystem 120 by hub links 40 and 50 for providing an interface with peripheral buses such as a non-legacy Peripheral Component Interconnect (PCI) buses 60 and 70 of different bandwidths and operating speeds, a flash memory 160, and a super I/O 170 connected to the chipset 150 by a low pin count (LPC) bus for providing an interface with a plurality of I/O devices 180, including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices. A different plurality of I/O devices 190 may be provided by the non-legacy PCI bus 60. In addition, it may be noted that the computer system 100 may be configured differently or employ some or different components than those shown in FIG. 1.

The processor subsystem 110 may include a plurality of host processors 110a–110nn. Each of the host processors 110a–110n may include a local APIC (not shown) of an APIC system such as an Intel 82489DX APIC described in the "*MultiProcessor Specification* (MPS)" Version 1.1., September 1994, Order Number 242016-003 from Intel Corporation. The memory subsystem 120 may include a memory controller hub (MCH) 122 connected to the host processors 110a–110n by a front side bus 10 (i.e., host bus or processor bus) and at least one memory element 124 connected to the MCH 122 by a memory bus 20. The memory element 124 may preferably be a dynamic random-access-memory (DRAM), but may be substituted for read-only-memory (ROM), video random-access-memory (VRAM) and the like. The memory element 124 stores information and instructions for use by the host processors 110a–110n. The graphics 130 may be connected to the main controller hub 122 of the memory subsystem 120 by an AGP bus (graphics bus) 30, and may include, for example, a graphics controller, a local memory and a display device (e.g., cathode ray tube, liquid crystal display, flat panel display, etc.).

The host chipsets (e.g., expansion bridges) 140 and 150 may be a Peripheral Component Interconnect (PCI) chips such as, for example, the PIIX4® chip and PIIX6® chip manufactured by Intel Corporation. In particular, the chipsets 140 and 150 may correspond to a Peripheral Component Interconnect 64-bit hub (P64H) 140 and an input/output controller hub (ICH) 150. The P64H 140 and the ICH 150 may be connected to the MCH 122 of the memory subsystem 120 respectively by 16 bits and 8 bits hub links 40 and 50, for example, and may operate as an interface between the front side bus 10 and peripheral buses such as a non-legacy Peripheral Component Interconnect (PCI) buses 60 and 70 of different bandwidths and operating speeds. The PCI bus may be a high performance 32 or 64 bit synchronous bus with automatic configurability and multiplexed address, control and data lines as described in the latest version of "*PCI Local Bus Specification, Revision* 2.1" set forth by the PCI Special Interest Group (SIG) on Jun. 1, 1995 for add-on arrangements (e.g., expansion cards) with new video, networking, or disk memory storage capabilities. For example, the PCI bus 60 of 64-bits and 66 MHz may connect to the P64H 140. Similarly, the PCI bus 70 of 32-bits and 33 MHz may connect to the ICH 150. Other types of bus architecture such as an Industry Standard Architecture (ISA) bus may also be utilized.

P64H 140 may include an IO APIC 142 of an APIC system such as an Intel 82489DX APIC described in the "*MultiProcessor Specification* (MPS)" Version 1.1., September 1994, a buffer 144 and an interrupt routing mechanism 146 constructed according to the principles of the present invention to route interrupt requests from the I/O devices 200 via the PCI bus 60. The 10 APIC 142 may be integrated within the P64H 140 rather than provided as a separate chip within a host chipset for simplicity. Connected to the PCI bus 60 may be one group of I/O devices 190, including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

Likewise, ICH 150 may include a direct memory access (DMA) controller 152, a timer 154, and an interrupt controller 156 such as an Intel 8259 PIC utilized according to the principles of the present invention to handle all incoming interrupts routed from the interrupt routing mechanism 146 of the P64H 140 via a hub link 80 for booting an operating system (OS). The interrupt controller 156 may also be integrated within the ICH 150 rather than provided as a separate chip within a host chipset for simplicity. The ICH 150 may also include universal serial bus (USB) ports and IDE ports for providing an interface to a hard disk drive (HDD) and compact disk read-only-memory (CD-ROM). In addition, the P64H 140 may optionally include another IO APIC of an APIC system for handling additional interrupts from a PCI bus 70, if additional interrupts are required.

The flash memory (e.g., EPROM) 160 and the super I/O 170 may be connected to the ICH 150 via a low pin count (LDC) bus. The flash memory 160 may store a set of system basic input/output start up (BIOS) routines at startup of the computer system 100. The super I/O 170 may provide an interface with another group of I/O devices 180, including, for example, a keyboard controller for controlling operations of an alphanumeric keyboard, a cursor control device such as a mouse, track ball, touch pad, joystick, etc., a mass storage device such as magnetic tapes, hard disk drives (HDD), and floppy disk drives (FDD), and serial and parallel ports to printers, scanners, and display devices.

The interrupt controller 156 of the ICH 150 may be cascaded to provided an expanded number of usable I/O interrupt request lines such as 16 signal lines IRQ1–IRQ15 (not shown) or 24 signal lines IRQ0–IRQ24 (not shown). The use of I/O interrupt request lines of an interrupt controller 156 such as an Intel 8259 PIC may be well known for chipset manufacturers. Some of these interrupt request lines may be dedicated to special I/O devices that reside on the system board. For example, IRQ0 may be connected to the system timer. IRQ1 may be connected to the keyboard interface. IRQ4 and IRQ7 may be connected to the serial port and the parallel port respectively. IRQ6 may be connected to a floppy disk controller. IRQ12 may be connected to the mouse interface. The remainder of the interrupt request lines may be available for use by expansion cards and may be connected to expansion slots such as non-legacy PCI slots from the PCI bus 60.

As described with reference to FIG. 1, the interrupt controller 150 of the ICH 150 such as an Intel 8259 PIC may be utilized along with the 10 APIC 142 of an APIC system of the P64H 140 to ensure proper operation of most operating systems (OS) since many operating systems (OS) such as Microsoft Windows 95/98, Sun Solaris and Netware Novell may not support APIC systems. However, external logic devices are necessarily required to route particular interrupts from I/O devices to the 8259 PIC via a non-legacy peripheral bus. General purpose I/O pins are then needed to enable/disable this functionality once an operating system (OS) which understands the APIC system is loaded. In addition, special software must also be written to operate those general purpose I/O pins to steer those particular interrupts to the 8259 PIC.

The present invention advantageously provides an efficient and cost-effective mechanism 146 implemented to eliminate the need for the general purpose I/O pins, special software and external logic devices to steer particular interrupts from the non-legacy PCI bus to an external interrupt controller 156 of the ICH 150 such as Intel 8259 PIC. Such an interrupt routing mechanism allows boot devices that are not on the legacy PCI bus (such as disk controllers, keyboard controllers, and network cards) to boot an operating system (OS) without being APIC aware, that is, an operating system that may not support an APIC system such as Microsoft Windows 95/98, Sun Solaris and Netware Novell. Boot devices may include those disk controllers, keyboard controllers, and network cards, and may be utilized during a booting operation of an operating system (OS).

Interrupts may be generated by a number of different sources, including, for example: (1) external I/O devices 180 connected to 10 APIC 142 of P64H 140 manifested by either edges (level transitions) or levels on interrupt input pins and may be redirected to any processor; (2) locally connected device interrupts; (3) APIC timer interrupts; (4) inter-processor interrupts addressed to any individual processor of groups of processors in support of software self interrupts, pre-emptive scheduling, cache memory table look-aside buffer flushing, and interrupt forwarding; and (5) bus parity error interrupt. For the sake of simplicity and for purposes of this disclosure, the interrupts for routing to an interrupt controller 156 such as Intel 8259 PIC may be those generated from a non-legacy PCI bus 60. However, those interrupts may not be limited thereto. Both PCI and non-PCI interrupts received from external I/O devices may be utilized.

The interrupt routing mechanism 146 according to the principles of the present invention may be integrated within the P64H 140 rather than having a separate chip formed as portion of the P64H 140. Such an interrupt routing mechanism 146 may be implemented by a series of logic gates for combining all interrupts from a non-legacy PCI bus 60 to produce a boot interrupt to an interrupt controller 156 as will be described with reference to FIGS. 2 and 3, and alternatively, implemented by a series of AND gates for combining all interrupts from a non-legacy PCI bus 60 to produce a boot interrupt in dependence upon a disable bit used for the steering function as will be described with reference to FIG. 4 hereinbelow.

Figure 2:
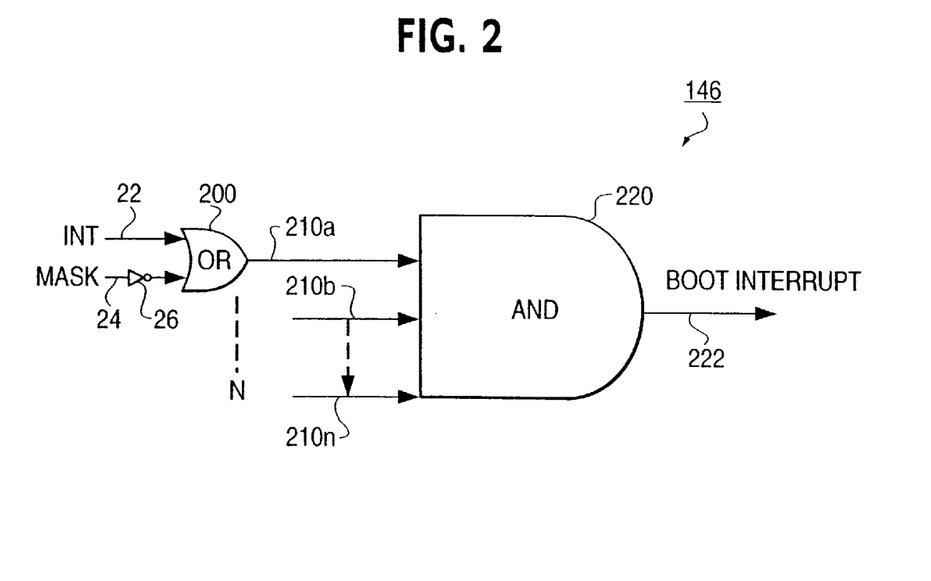
FIG. 2 illustrates a simplified circuit diagram of an example interrupt routing mechanism for routing interrupts from a peripheral bus such as a non-legacy PCI bus to an interrupt controller for booting an operating system (OS) according to the principles of the present invention.

Refer now to FIG. 2, a simplified circuit diagram of an example interrupt routing mechanism 146 for routing interrupts from a non-legacy PCI bus 60 to an interrupt controller 156 of an ICH 150 for booting an operating system (OS) according to the principles of the present invention is illustrated. As shown in FIG. 2, each input interrupt of a plurality of N interrupts from the non-legacy PCI bus 60 on an interrupt request line 22 along with a corresponding mask bit (i.e., internal register of an APIC system) from a redirection table (not shown) of an APIC system on line 24 via an inverter 26 may be applied to input terminals of a first logic gate 200 such as an OR gate in order to generate a first output signal on line 210a. N interrupts may represent up to 24 interrupt request lines (IRQ0–IRQ23). The resultant output signals on lines 210a, 210b . . . 210n may then be combined by a second logic gate 220 such as an AND gate in order to generate a boot interrupt on line 222 to the interrupt controller 156 of the ICH 150 via hub link 80. Each interrupt may be qualified with its mask. If an interrupt INT is not masked, the boot interrupt BT_INTR generated from the AND gate 220 may be passed to the external interrupt controller 156 of ICH 150 via the hub link 80. However, if an interrupt INT is masked, a boot interrupt BT_INTR generated from the AND gate 220 may not be passed to the external interrupt controller 156 of ICH 150 via the hub link 89. Instead, all interrupts may be enabled/disabled individually through the 10 APIC 142 of the P64H 140.

The boot interrupt BT_INTR may be utilized to allow boot devices that are not on the legacy PCI bus (such as disk controllers, keyboard controllers, and network cards) to boot an operating system (OS) without being APIC aware. Basically, when the computer system 100 boots up, all incoming interrupts from the non-legacy PCI bus 60 may be exclusively combined by the OR gate 200 and logically combined by the AND gate 220 to produce a boot interrupt BT_INTR on line 222.

Figure 3:
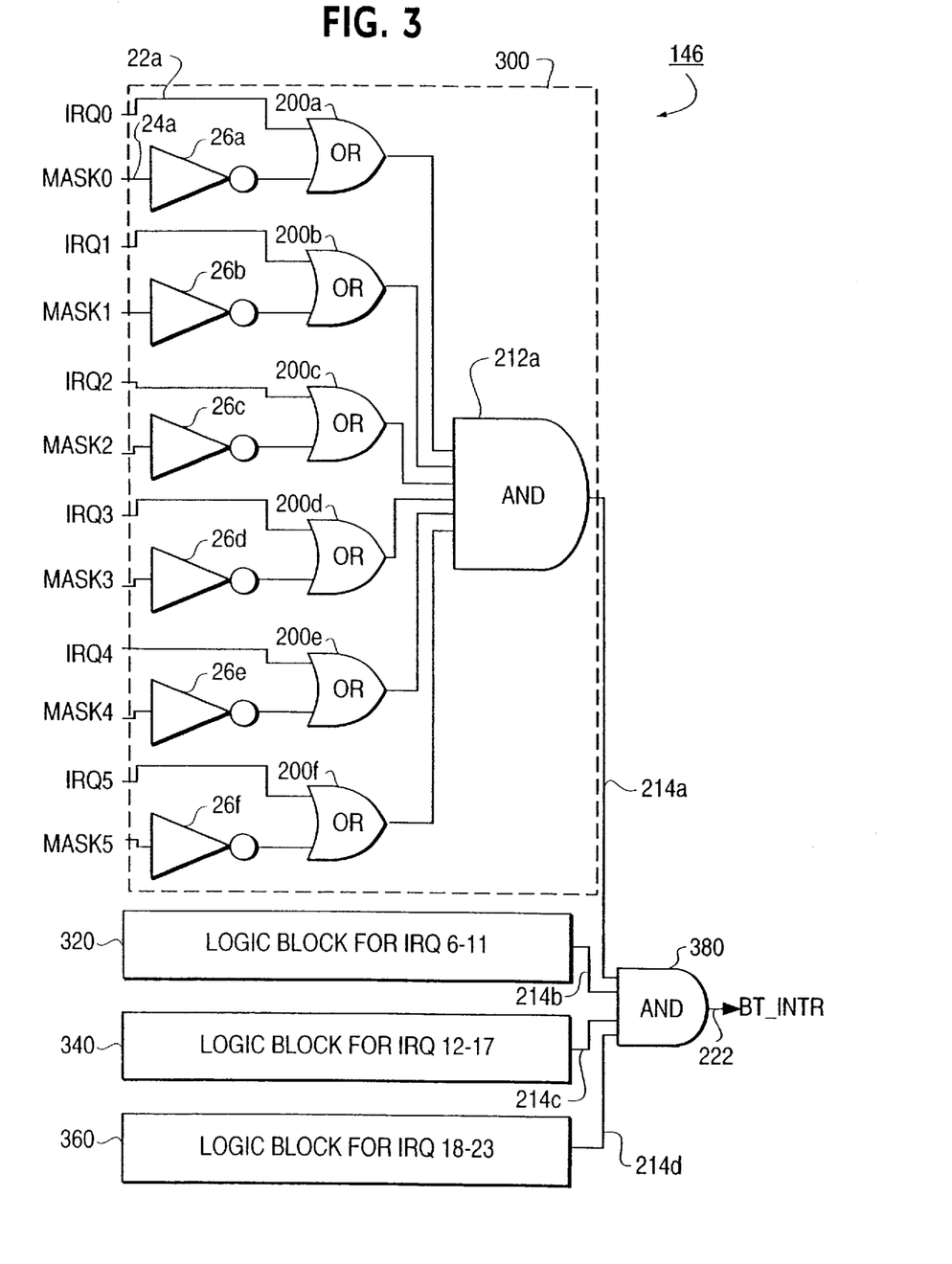
FIG. 3 illustrates a detailed circuit diagram of an example interrupt routing mechanism as shown in FIG. 2.

FIG. 3 illustrates a detailed circuit diagram of an example interrupt routing mechanism 146 as shown in FIG. 2. The use of logic gates such as OR gate and AND gate may be extended to accommodate, for example, twenty-four (24) different interrupts on interrupt request lines IRQ0–IRQ23 and corresponding mask bits MASK0–MASK23. The example interrupt routing mechanism may comprise four input logic blocks 300, 320, 340 and 360 for handling twenty-four (24) interrupts on interrupt request lines IRQ0–IRQ23, and an output AND gate 380 for combining resultant output signals 242a–242d from the logic blocks 300, 320, 340 and 360 to produce a boot interrupt BT_INTR on line 222.

The first logic block 300 may include first to sixth OR gates 200a–200f having input terminals coupled to receive first to sixth input interrupts IRQ0–IRQ5 from the non-legacy PCI bus 60 on interrupt request lines 22a–22f along with corresponding mask bits MASK0–MASK5 on lines 24a–24f via inverters 26a–26f to produce first to sixth output signals on lines 210a–210f, and an AND gate 212a having input terminals coupled to receive first to sixth output signals on lines 210a–210f to produce a first logic signal on line 214a.

Similarly, the second logic block 320 may include seventh to twelve OR gates 200g–200m having input terminals coupled to receive seventh to twelve input interrupts IRQ6–IRQ11 from the non-legacy PCI bus 60 on interrupt request lines 22g–22m along with corresponding mask bits MASK6–MASK11 on lines 24g–24m via inverters 26g–26m to produce seventh to twelve output signals on lines 210g–210m, and an AND gate 212b having input terminals coupled to receive seventh to twelve output signals on lines 210g–210m to produce a second logic signal on line 214b.

The third logic block 340 may include thirteenth to eighteenth OR gates 200n–200s having input terminals coupled to receive thirteenth to eighteenth input interrupts IRQ12–IRQ17 from the non-legacy PCI bus 60 on interrupt request lines 22n–22s along with corresponding mask bits MASK12–MASK17 on lines 24n–24s via inverters 26n–26s to produce thirteenth to eighteenth output signals on lines 210n–210s, and an AND gate 212c having input terminals coupled to receive the thirteenth to eighteenth output signals on lines 210n–210s to produce a third logic signal on line 214c.

Lastly, the fourth logic block 360 may include nineteenth to twenty-third OR gates 200t–200z having input terminals coupled to receive nineteenth to twenty-third input interrupts from the non-legacy PCI bus 60 on interrupt request lines 22t–22z along with corresponding mask bits MASK18–MASK23 on lines 24t–24z via inverters 26t–26z to produce nineteenth to twenty-third output signals on lines 210t–210z, and an AND gate 212d having input terminals coupled to receive the nineteenth to twenty-third output signals on lines 210t–210z to produce a fourth logic signal on line 214d.

The resultant output signals on lines 214a, 214b, 214c and 214d may then be combined by a second AND gate 220 in order to generate a boot interrupt BT_INTR on line 222 to the interrupt controller 156 of the ICH 150 via hub link 80. The boot interrupt BT_INTR may then be utilized to allow boot devices that are not on the legacy PCI bus (such as disk controllers, keyboard controllers, and network cards) to boot an operating system (OS) without being APIC aware.

Figure 4:
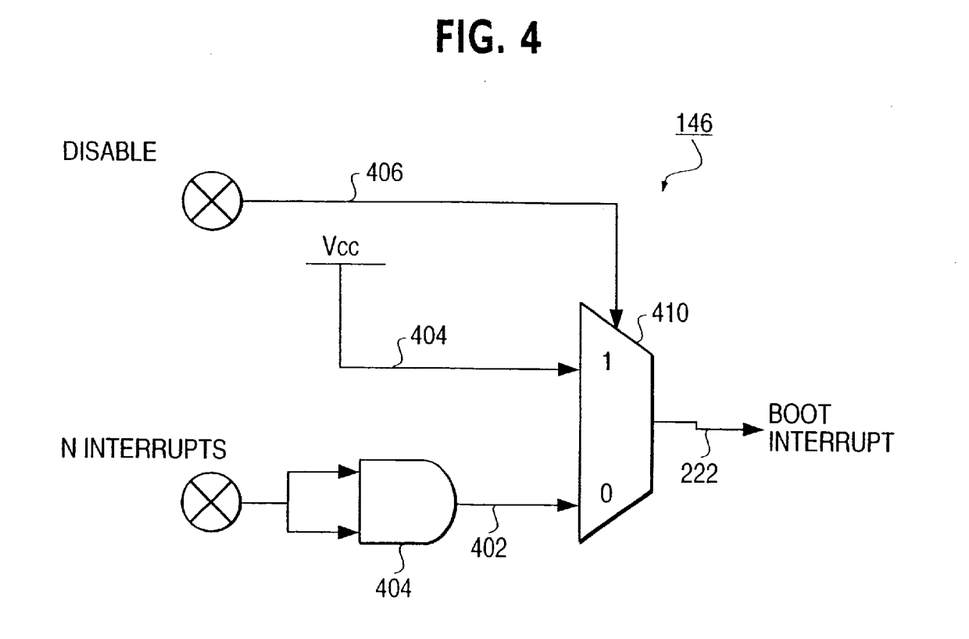
FIG. 4 illustrates a general circuit diagram of another example interrupt routing mechanism for routing interrupts from a peripheral bus such as a non-legacy PCI bus to an interrupt controller for booting an operating system (OS) according to the principles of the present invention.

FIG. 4 illustrates a general circuit diagram of another example interrupt routing mechanism 146 for routing interrupts from a non-legacy PCI bus 60 to an interrupt controller 156 of an ICH 150 for booting an operating system (OS) according to the principles of the present invention. As shown in FIG. 4, the alternative interrupt routing mechanism 146 may comprise a combination of logic gates 400 such as AND gates which logically combine all interrupts (N=24) from the PCI bus 60 to produce an ANDed output on line 402, and a multiplexer (e.g., switch) 410 which selects an output (i.e., boot interrupt BT_INTR) on line 222 from an ANDed output on line 402 or a predetermined threshold input Vcc on line 404 in accordance with a disable bit input on line 406.

The disable or selected bit may be asserted for steering function, that is, to qualify the passage of a boot interrupt BT_INTR to an external interrupt controller 156 of the ICH 150 such as Intel 8259 PIC. The disable bit may be generated from well-know logic devices which monitor memory write cycles to an APIC ID register contained in the IO APIC 142 of the APIC system. The I/O APIC ID register may be programmed by the system basic input/output startup (BIOS) or the operating system (OS) to steer those particular interrupts from the PCI bus 60 to the external interrupt controller 156 of ICH 150. If the I/O APIC ID register is not programmed, then the operating system (OS) is not APIC aware. The disable bit may be false, and the ANDed output (boot interrupt BT_INTR) on line 402 may be passed to the external interrupt controller 156 of ICH 150 such as Intel 8259 PCI for booting purposes. However, if the I/O APIC ID register is programmed, then the operating system (OS) is APIC aware. At this point, the disable bit may become true, and the ANDed output on line 402 may not be passed to the external interrupt controller 156 of ICH 150 such as Intel 8259 PCI. Instead, all interrupts may now be enabled/disabled individually through the I/O APIC 142 of the P64H 140.

Basically, when the operating system (OS) boots up, all incoming interrupts from the PCI bus 60 may be ANDed together. The interrupts may remain active low, so if one or more interrupts are active, the output of the AND gate 400 may be low. The ANDed output on line 402 may then be qualified with the disable bit. If the disable bit is cleared, then the boot interrupt output may pass to an output pin which is connected to the external interrupt controller 156 of ICH 150 such as Intel 8259 PIC.

Figure 5:
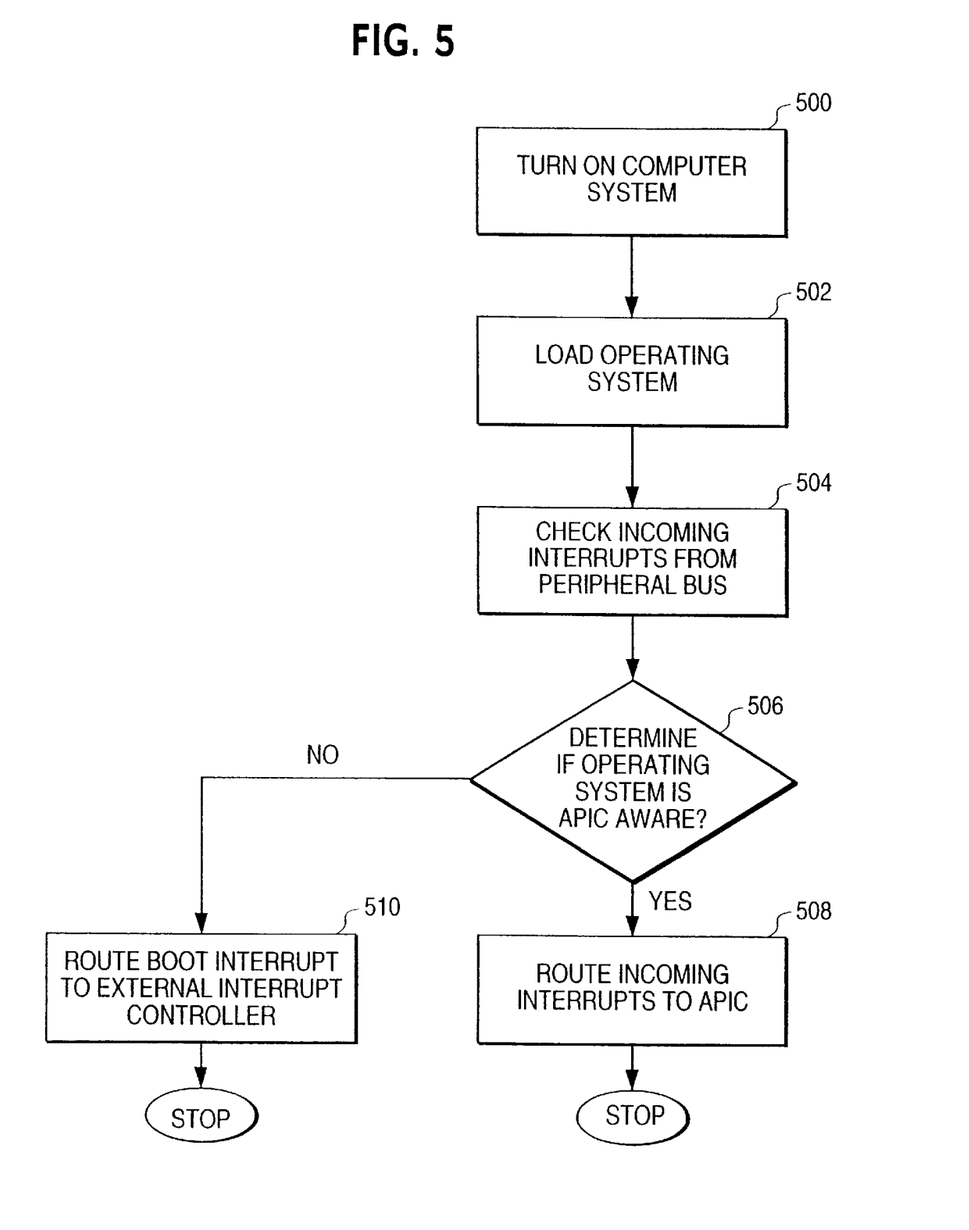
FIG. 5 illustrates a flowchart of routing interrupts from a peripheral bus such as a non-legacy PCI bus according to the principles of the present invention.

FIG. 5 illustrates a flowchart of routing interrupts from a peripheral bus such as a non-legacy PCI bus 60 in a computer system having an 10 APIC and an interrupt controller incorporated to handle different levels of interrupts while ensuring proper operation of an operating system (OS) according to the principles of the present invention. At block 500, a computer system 100 may be turned on and a proper initialization sequence may be started. The initialization may include loading an operating system (OS) and setting up initial computer parameters at block 502. The initialization sequence may also include receiving and logically combining all incoming interrupts from a peripheral bus such as a non-legacy PCI bus 60 at block 504. The initialization sequence also determines whether the operating system (OS) loaded into a random-access-memory (RAM) at block 502 is APIC aware at block 506. The operating system (OS) is APIC aware, when the disable or selected bit may be asserted for steering function, that is, to qualify the passage of a boot interrupt BT-INTR to an external interrupt controller 156 of the ICH 150 such as Intel 8259 PIC. As described, the disable bit may be asserted when the I/O APIC ID register is programmed. Conversely, the operating system (OS) is not APIC aware, when the disable bit may be de-asserted.

If the operating system (OS) is APIC aware at block 506, the combined logic output (boot interrupt BT_INTR) may be passed to an I/O APIC 142 of the P64H 140 for handling interrupt requests from a non-legacy PCI bus 60 at block 508. However, if the operating system (OS) is not APIC aware at block 506, the combined logic output (boot interrupt BT_INTR) may be passed to an external interrupt controller 156 of the ICH 150 for handling interrupt requests from the non-legacy PCI bus 60, allowing boot devices that are not on the legacy PCI bus (such as disk controllers, keyboard controllers, and network cards) to boot an operating system (OS) without being APIC aware at block 510.

As described from the foregoing, the present invention advantageously provides an interrupt routing mechanism implemented to eliminate the need for the general purpose I/O pins, special software and external logic devices to steer particular interrupts from the non-legacy PCI bus to an external interrupt controller such as Intel 8259 PIC. The interrupt routing mechanism may be implemented by a series of logic gates for combining all interrupts from a non-legacy PCI bus to produce a boot interrupt to an external interrupt controller as shown in FIGS. 2–3, and alternatively by a series of AND gates for combining all interrupts from a non-legacy PCI bus to produce a boot interrupt in dependence upon a disable bit used for the steering function as shown in FIG. 4. The embodiment of FIGS. 2–3 may be preferred since the circuit may be designed to eliminate the use of a disable bit used for the steering function as required by the embodiment of FIG. 4.

While there have been illustrated and described what are considered to be exemplary embodiments of the present invention, it will be understood by those skilled in the art and as technology develops that various changes and modifications may be made, and equivalents may be substituted for elements thereof without departing from the true scope of the present invention. For example, the computer system as shown in FIG. 1 may be configured differently or employ some or different components than those illustrated. In addition, the interrupt routing mechanism shown in FIGS. 2–4 may be configured differently or employ some or different components than those illustrated without changing the basic function of the invention. For instance, different combinations of logic gates such as AND, OR, NOR, NAND etc. may be used to combine all interrupts together and then qualify the combined logic with a disable bit along a signal path. Further, software equivalents to the interrupt routing mechanism as shown in FIGS. 2–4 may be available to steer different interrupts from different I/O devices to an interrupt controller such as an Intel 8259 PIC. Many modifications may be made to adapt the teachings of the present invention to a particular situation without departing from the scope thereof. Therefore, it is intended that the present invention not be limited to the various exemplary embodiments disclosed, but that the present invention includes all embodiments falling within the scope of the appended claims.

What is claimed is:

1. A mechanism of a host chipset for routing interrupts from a peripheral bus to an interrupt controller, comprising:
    input terminals coupled to interrupt request lines of input/output (I/O) devices from said peripheral bus, to receive incoming interrupts from said peripheral bus; and
    logic circuitry arranged to logically combine the interrupts received at the input terminals and to pass an output boot interrupt to the interrupt controller, when an operating system (OS) does not support an advanced peripheral interrupt controller (APIC) integrated in said host chipset, wherein said logic circuitry comprises:
        one or more first logic gates arranged to receive an individual interrupt from the peripheral bus, and to logically combine all incoming interrupts; and
        one or more second logic gates arranged to receive outputs from the first logic gates, and to logically combine the outputs from the first logic gates to pass the boot interrupt tote interrupt controller external to said host chipset, when the operating system (OS) is not APIC aware.

2. The mechanism as claimed in claim 1, wherein said peripheral bus corresponds to a Peripheral Component Interconnect (PCI) bus, said interrupt controller external to said host chipset corresponds to an Intel 8259 Peripheral Interrupt Controller (PIC), and said advanced peripheral interrupt controller (APIC) corresponds to an Intel 82489DX APIC.

3. The mechanism as claimed in claim 1, wherein:
    said one or more first logic gates corresponds to OR gates each coupled to receive an incoming interrupt from the peripheral bus along with a corresponding mask bit via an inverter, for logically combining all incoming interrupts to generate a plurality of ORed outputs; and
    said one or more second logic gates corresponds to AND gates coupled to receive said plurality of ORed outputs, for logically combining said plurality of ORed outputs to pass the boot interrupt output to the interrupt controller external to said host chipset, when the incoming interrupts are not masked by corresponding mask bits indicating that the operating system (OS) is not APIC aware.

4. The mechanism as claimed in claim 1, wherein:
    said one or more first logic gates corresponds to at least one AND gate coupled to receive incoming interrupts from the peripheral bus, for logically combining the incoming interrupts to generate an ANDed output; and
    said one or more second logic gates correspond to a switch for forwarding the ANDed output as the boot interrupt to the interrupt controller external to said host chipset, when a disable bit indicates that the operating system is not APIC aware.

5. The mechanism as claimed in claim 4, wherein said switch corresponds to a multiplexer.

6. The mechanism as claimed in claim 4, wherein said boot interrupt is utilized to allow boot devices that are not on the peripheral bus to boot the operating system (OS) without being APIC aware.

7. A computer system, comprising:
    a host processor;
    a memory controller coupled to the host processor to control memory operations;
    a first chipset coupled to the memory controller to provide an interface with a first peripheral bus, said first chipset including at least an advanced peripheral interrupt controller (APIC) for handing interrupts and an interrupt routing mechanism for routing incoming interrupts from said first peripheral bus; and
    a second chipset coupled to the memory controller to provide an interface with a second peripheral bus, said second chipset including at least an interrupt controller for handling interrupts;
    wherein said interrupt routing mechanism of said first chipset routes incoming interrupts from said first peripheral bus to the interrupt controller of said second chipset, and comprises logic circuitry arranged to logically combine the incoming interrupts and to pass an output boot interrupt to the interrupt controller, when an operating system (OS) does not support an advanced peripheral interrupt controller (APIC) of said first chipset.

8. The computer system as claimed in claim 7, wherein said first peripheral bus and said second peripheral bus correspond to Peripheral Component Interconnect (PCI) buses of different speeds and bandwidths, said interrupt controller of said first chipset corresponds to an Intel 8259 Peripheral Interrupt Controller (PIC), and said advanced peripheral interrupt controller (APIC) corresponds to an Intel 82489DX APIC.

9. The computer system as claimed in claim 7, wherein said first chipset corresponds to a Peripheral Component Interconnect (PCI) 64-bit hub, and said second chipset corresponds to an I/O controller hub.

10. The computer system as claimed in claim 7, wherein said logic circuitry comprises:

OR gates each coupled to receive an incoming interrupt from the first peripheral bus along with a corresponding mask bit via an inverter, for logically combining all incoming interrupts to generate a plurality of ORed outputs; and AND gates coupled to receive said plurality of ORed outputs, for logically combining said plurality of ORed outputs to pass the boot interrupt output to the interrupt controller of said second chipset, when the incoming interrupts are not masked by corresponding mask bits indicating that the operating system (OS) is not APIC aware.

11. The computer system as claimed in claim 7, wherein said logic circuitry comprises:

at least one AND gate coupled to receive incoming interrupts from the first peripheral bus, for logically combining the incoming interrupts to generate an ANDed output; and a switch for forwarding the ANDed output as the boot interrupt to the interrupt controller of said second chipset, when a disable bit indicates that the operating system is not APIC aware.

12. The computer system as claimed in claim 11, wherein said switch corresponds to a multiplexer.

13. The computer system as claimed in claim 7, wherein said boot interrupt is utilized to allow boot devices that are not on the first peripheral bus to boot the operating system (OS) without being APIC aware.

14. The computer system as claimed in claim 7, further comprising:

a flash memory connected to the second chipset, to store the operating system (OS) and a set of system basic input/output start up (BIOS) routines at startup; and a super I/O connected to the second chipset, to provide an interface with a group of I/O devices, including a keyboard controller for controlling operations of an alphanumeric keyboard, a cursor control device, a mass storage device, and serial and parallel ports.

15. The computer system as claimed in claim 7, wherein said boot interrupt is utilized to allow boot devices that are not on the first peripheral bus to boot the operating system (OS) without being APIC aware.

16. A method for routing interrupts from a peripheral bus in a computer system having an advanced peripheral interrupt controller (APIC) incorporated in a first chipset and an interrupt controller incorporated in a second chipset to handle different levels of interrupts while ensuring proper operation of an operating system, comprising:

loading an operating system and executing an initialization sequence;

determining whether the operating system is APIC aware;

when the operating system is not APIC aware, logically combining incoming interrupts from said peripheral bus at said first chipset and routing an output boot interrupt to the interrupt controller at said second chipset for allowing boot devices that are not on the peripheral bus to boot the operating system; and when the operating system is APIC aware, routing the incoming interrupts from said peripheral bus to the APIC at said first chipset for interrupt processing.

17. The method as claimed in claim 16, wherein said operating system is determined as APIC aware, when an I/O APIC identification register is programmed by said operating system to steer particular interrupts to the interrupt controller at said second chipset.

18. The method as claimed in claim 16, wherein said incoming interrupts from said peripheral bus are logically combined using a series of AND gates for combining all interrupts together and a switch for forwarding an output boot interrupt to the interrupt controller at said second chipset, when the operating system is not APIC aware.

19. The method as claimed in claim 16, wherein said peripheral bus corresponds to a Peripheral Component Interconnect (PCI) bus, said interrupt controller external to said host chipset corresponds to an Intel 8259 Peripheral Interrupt Controller (PIC), and said advanced peripheral interrupt controller (APIC) corresponds to an Intel 82489DX APIC.

20. The method as claimed in claim 16, wherein said first chipset corresponds to a Peripheral Component Interconnect (PCI) 64-bit hub, and said second chipset corresponds to an I/O controller hub.

21. A computer system, comprising:

at least one host processor including an operating system (OS);

a memory controller coupled to the host processor;

an interrupt controller coupled to the memory controller, to handle interrupts for enabling booting the operating system (OS); and an interrupt routing mechanism coupled to the memory controller, to route incoming interrupts from a non-legacy bus to the interrupt controller, said interrupt routing mechanism including logic circuitry arranged to logically combine the incoming interrupts and to generate a boot interrupt to the interrupt controller for enabling booting the operating system (OS).

22. The computer system as claimed in claim 21, wherein said peripheral bus corresponds to a Peripheral Component Interconnect (PCI) bus of a designated speeds and bandwidth, and said interrupt controller corresponds to an Intel 8259 Peripheral Interrupt Controller (PIC).

23. The computer system as claimed in claim 21, wherein said logic circuitry comprises:

OR gates each coupled to receive an incoming interrupt from the peripheral bus along with a corresponding mask bit via an inverter, for logically combining all incoming interrupts to generate a plurality of ORed outputs; and AND gates coupled to receive said plurality of ORed outputs, for logically combining said plurality of ORed outputs to pass the boot interrupt output to the interrupt controller, when the incoming interrupts are not masked by corresponding mask bits indicating that the operating system (OS) is not APIC aware.

24. The computer system as claimed in claim 21, wherein said logic circuitry comprises:

at least one AND gate coupled to receive incoming interrupts from the peripheral bus, for logically combining the incoming interrupts to generate an ANDed output; and a switch for forwarding the ANDed output as the boot interrupt to the interrupt controller, when a disable bit indicates that the operating system is not APIC aware.

25. The computer system as claimed in claim 21, wherein said switch corresponds to a multiplexer.

26. The computer system as claimed in claim 21, wherein said boot interrupt is utilized to allow boot devices that are not on the peripheral bus to boot the operating system (OS) without being APIC aware.

* * * * *